(12) United States Patent
Madananth

(10) Patent No.: US 9,323,880 B2
(45) Date of Patent: Apr. 26, 2016

(54) APPARATUS AND METHOD FOR FILE TRANSLATION

(71) Applicant: GE Intelligent Platforms, Inc., Charlottesville, VA (US)

(72) Inventor: Shrinidhi Shrinivas Madananth, Bangalore (IN)

(73) Assignee: GE INTELLIGENT PLATFORMS, INC, Charlottesville, VA (US)

( * ) Notice: Subject to any disclaimer, the term of this patent is extended or adjusted under 35 U.S.C. 154(b) by 0 days.

(21) Appl. No.: 14/289,018

(22) Filed: May 28, 2014

(65) Prior Publication Data

US 2015/0347658 A1  Dec. 3, 2015

(51) Int. Cl.
  *G06F 17/50* (2006.01)
(52) U.S. Cl.
  CPC .................... *G06F 17/5072* (2013.01)
(58) Field of Classification Search
  CPC .................................................. G06F 17/5072
  USPC .......................................................... 716/137
  See application file for complete search history.

(56) References Cited

U.S. PATENT DOCUMENTS

| | | | |
|---|---|---|---|
| 5,781,447 A * | 7/1998 | Gerdes ........................... | 716/103 |
| 6,920,624 B2 | 7/2005 | Garrepally et al. | |
| 6,938,227 B2 * | 8/2005 | Murphy et al. ................ | 716/102 |
| 7,402,507 B2 | 7/2008 | Standing et al. | |
| 7,441,219 B2 * | 10/2008 | Perry et al. ..................... | 716/118 |
| 8,248,656 B2 | 8/2012 | Lin et al. | |
| 2008/0304767 A1 | 12/2008 | Toyofuku | |
| 2011/0037656 A1 | 2/2011 | Bremner et al. | |

FOREIGN PATENT DOCUMENTS

| | | |
|---|---|---|
| CN | 102521437 A | 6/2012 |
| KR | 100749050 B1 | 8/2007 |
| WO | 0052975 A1 | 9/2000 |
| WO | 2004015597 A1 | 2/2004 |

OTHER PUBLICATIONS

"Powerful CAD and Gerber support capability". http://www.vayoinfo.com/en/cad_convert/index.html, May 2014.

* cited by examiner

*Primary Examiner* — Jack Chiang
*Assistant Examiner* — Brandon Bowers
(74) *Attorney, Agent, or Firm* — GE Global Patent Operation

(57) ABSTRACT

Methods and apparatuses for modifying a Gerber-compliant data structure that is representative of an existing printed circuit board (PCB) layout are described. This may include obtaining a Gerber-compliant data structure which includes layout information describing the physical layout of a PCB, obtaining modification information representing a modification to the physical layout of the PCB, and automatically modifying the Gerber-compliant data structure to seamlessly incorporate the modification information to create a new electrical connectivity structure for the Gerber-compliant data structure.

15 Claims, 9 Drawing Sheets

APPARATUS AND METHOD FOR FILE TRANSLATION

BACKGROUND OF THE INVENTION

1. Field of the Invention

The subject matter disclosed herein relates to designing Printed Circuit Boards (PCBs) using file translation approaches.

2. Brief Description of the Related Art

PCB design software is well known by those in the industry. Previous designs may have been created in PCB design software that is now obsolete or no longer in use by organizations due to a lack of support for this infrastructure. Oftentimes, it is necessary to modify an existing PCB design for enhancement of the product. In such a scenario, a Gerber file, or a universally acceptable output of most PCB design software describing the layout of each layer of a PCB in addition to corresponding shape constraints, may be used to import into current PCB design software and may be converted into electrical format. Most existing PCB design software currently in use allows importing the Gerber data as-is. Alternatively, the Gerber data can be converted to a different format (such as Drawing Exchange Format or DXF) and subsequently importing new information in the same DXF format.

The process to convert an existing file to a current readable output is oftentimes tedious and repetitive in nature. Each element of the Gerber data must be manually entered into the software currently in use. This manual entry oftentimes results in the inefficient usage of resources and may generate numerous errors, which may lead to incorrect PCB designs.

BRIEF DESCRIPTION OF THE INVENTION

The approaches described herein provide a reduced cost to convert existing PCB layouts and an effective utilization of available resources by automating the conversion process. Further, efficiencies may increase and errors may decrease due to reduced requirement of manual intervention. Additionally, organizations will no longer need to maintain legacy PCB design software or the corresponding infrastructure supporting this software.

In many of these embodiments, a method of modifying a Gerber-compliant data structure that is representative of an existing PCB layout includes obtaining a Gerber-compliant data structure which includes layout information describing a physical layout of a PCB, obtaining modification information representing a modification to the physical layout of the PCB, and automatically modifying the Gerber-compliant data structure to seamlessly incorporate the modification information. The modification information includes modified or additional electrical connectivity information that is incorporated into the Gerber-compliant data structure to create a new electrical connectivity structure for the Gerber-compliant data structure. In some aspects, the modified Gerber-compliant data structure is then used to construct a PCB according to this data structure. In some examples, a second and new Gerber-compliant data structure is created.

In some examples, the data structure is in the form of a computer file. Further, in some other examples, obtaining the modification information may include receiving a schematics drawing representation. In other examples, obtaining the modification information may include manual entry of the modification information.

In some aspects, the modification information may include netlist information, schematic information, connectivity information, sizing information, logical information, electrical component information, and component land pattern information. The electrical connectivity information may describe connections between multiple electronic components.

In others of these embodiments, an apparatus which is configured to modify a Gerber-compliant data structure representative of an existing PCB boar layout is provided. The apparatus includes an interface having an input and an output, and a controller coupled thereto that is configured to obtain a Gerber compliant data structure at the interface input. The Gerber-compliant data structure includes layout information which describes a physical layout of a PCB. Further, the controller is configured to obtain modification information representing a modification to the physical layout of the PCB at the input. This modification information may include modified or additional electrical connectivity information. In this approach, the controller is further configured to automatically modify the Gerber-compliant data structure to seamlessly incorporate the modification information to create a new electrical connectivity structure for the Gerber-compliant data structure. The controller is configured to present the modified Gerber-compliant data structure at the output. The modified Gerber-compliant data structure may be utilized by a manufacturer to construct a PCB.

BRIEF DESCRIPTION OF THE DRAWINGS

For a more complete understanding of the disclosure, reference should be made to the following detailed description and accompanying drawings wherein.

Figure 1:
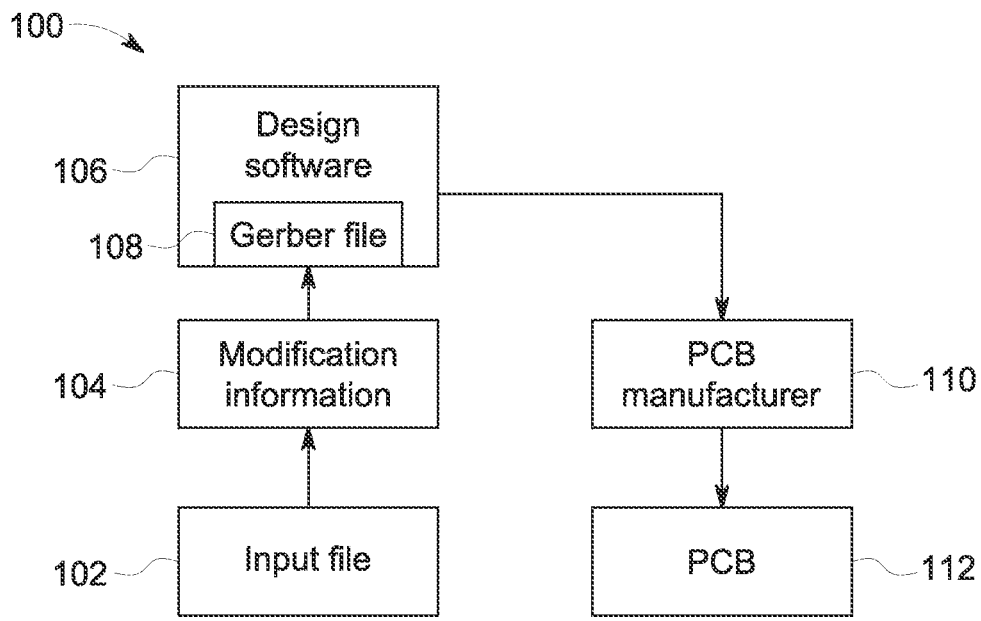
FIG. 1 comprises a block diagram illustrating a process for file translation according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

Approaches are provided that overcome various problems prevalent in file translation. Gerber data, which is a universally acceptable output of many PCB design approaches and describes the layout of each layer of a PCB by containing coordinates describing where a shape is to be printed, what geometry the shape should take on, and where the shape should end, can be used to import into the current PCB design software and convert it into an appropriate electrical format. PCB design software currently in use typically allows importing the Gerber data in its present form, or alternatively, the Gerber data may be converted to DXF format and the importing may occur in the DXF format. Next, a board outline may be created, or the boundary of the PCB may be created.

Next, the component footprint is created if it is not already available in the existing parts library. The component footprint is the physical dimension of the component that can be created using the dimensions of the geometry available in the Gerber data and the part library, which combined contain all the parameters of each part including component footprint that is stored in the library.

Modification information to be imported in the PCB design file may contain the logical information describing connectivity between component footprint elements referred to as pins as well as the parts that are used in the design. The parts are then placed in their respective coordinates using necessary information from the Gerber data.

The process of changing each Gerber data element into its respective electrical entity is automated. Each electrical layer must be identified from the Gerber data and the corresponding via sizes that are used and map it to its respective electrical layer and vias that exists in the current PCB design software.

The automation first adds vias to its respective coordinates without any net information attached to it. Next, the automation then looks for each pin and converts any selected layer of Gerber data element that is not in a closed polygon, overlapping, or intersecting to the respective electrical layer as a trace object. The trace object is then assigned the net name as Pin net name, which becomes a valid net name, and the geometry information is passed by the Gerber data to the trace object. This is repeated for each element of Gerber data for its respective layer until all the trace objects are converted and are assigned a valid net name.

The trace object having a valid net name will view any vias overlapping or intersecting it and convert the via net name to the trace object net name. This file may now be used as master file and sections of it may be modified as part of the enhancement of the product.

In some approaches, a computer usable medium having a computer readable program code embodied therein is provided. The computer readable program code may be adapted to be executed to implement the method of modifying a Gerber-compliant data structure that is representative of an existing PCB layout, and may include obtaining a Gerber-compliant data structure including layout information describing a physical layout of a PCB, obtaining modification information representing a modification to the physical layout of the PCB, and automatically modifying the Gerber-compliant data structure to seamlessly incorporate the modification information. In some approaches, the modification information may include modified or additional electrical connectivity information. In other approaches, the modified or additional electrical connectivity information is incorporated into the Gerber-compliant data structure to create a new electrical connectivity structure for the Gerber-compliant data structure.

Referring now to FIG. 1, one example of a process 100 for file translation is described. The process 100 includes and/or utilizes an input file 102, modification information 104, design software 106 including a Gerber file 108, a PCB manufacturer 110, and a resultant modified PCB 112. In the process 100, an input file 102 and modification information 104 is provided to design software 106.

In some aspects, the design software 106 may take the input file 102 and modification information 104 and create a new Gerber file 108. Alternatively, the input file 102 may already be a Gerber format, and the modification information 104 is then applied to the input file 102 to create a revised Gerber file 108. After the Gerber file 108 is created or modified, this file is sent to a PCB manufacturer 110 who may then create a modified PCB 112.

By "software" and as used herein, it is meant computer instructions that are executed on a general purposes computer processor such as a microprocessor or the like.

It will be understood that the input file 102 is a Gerber-compliant data structure which includes layout information describing a physical layout of the PCB. Further, the modification information 104 represents a modification to the physical layout of the PCB and includes modified or additional electrical connectivity information.

The design software 106 automatically modifies the Gerber file 108 and seamlessly incorporates the modification information 104 to the input file 102. Thus, in some aspects, the input is a computer file previously saved from an existing PCB design. In some approaches, the modification information 104 may consist of a schematics drawing representation that must be scanned into a computer-readable format. In other approaches, the modification information 104 may require a user to manually enter the information into the design software 106.

The modification information 104 may include netlist information, schematic information, connectivity information, sizing information, logical information, electronic component information, and component land pattern information. The modification information 104 may include electrical connectivity information having connections between multiple electronic components.

Figure 2:
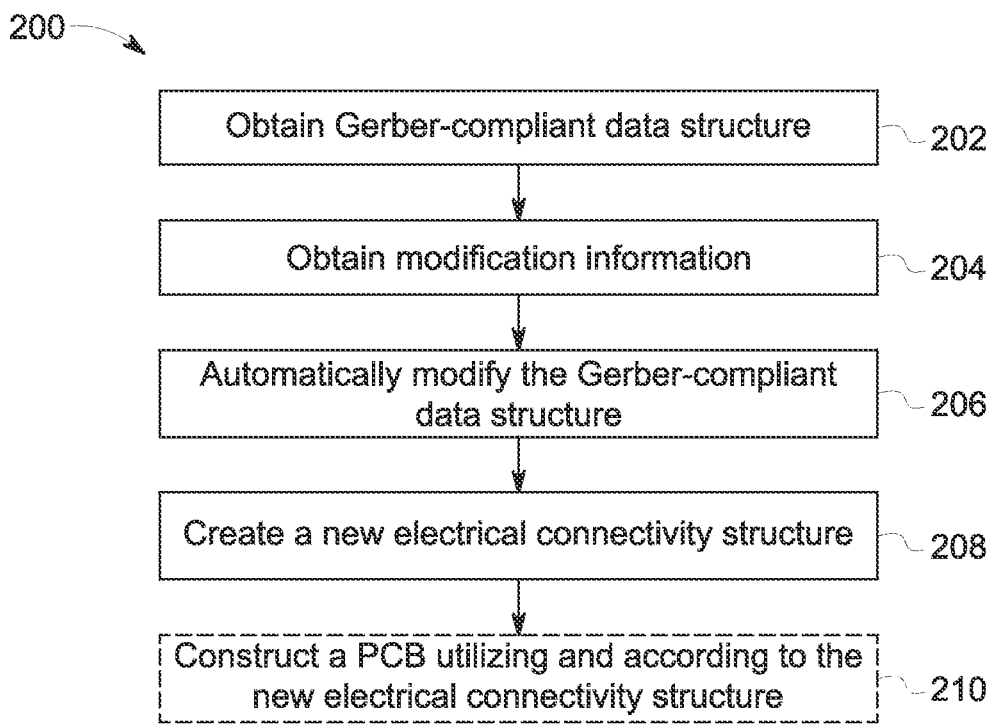
FIG. 2 comprises a flow chart illustrating a method for modifying a Gerber-compliant data structure according to various embodiments of the present invention.

Referring now to FIG. 2, a flow chart illustrating a method for modifying a Gerber-compliant data structure 200 is herein described. First, at step 202, a Gerber-compliant data structure is obtained. This data structure includes layout information describing a physical layout of a PCB. Next, at step 204, modification information representing a modification to the physical layout of a PCB is obtained. This modification information includes modified or additional electrical connectivity information. At step 206, the Gerber-compliant data structure is automatically modified to seamlessly incorporate the modification information. The modified information is incorporated into the Gerber-compliant data structure to create a new electrical connectivity structure for the Gerber-compliant data structure at step 208.

At step 210, a PCB is constructed utilizing and according to the new electrical connectivity structure. In other approaches, the data structure obtained at step 202 may be an electronic computer file. The step 204 of obtaining the modification information may comprise receiving a schematics drawing representation. Alternatively, step 204 may include manually entering the modification information.

In some approaches, the modification information may include at least one of netlist information, schematic information, connectivity information, sizing information, logical information, electronic component information, and component land pattern information. It will be understood that the modification information may include additional information.

In some approaches, the electrical connectivity information may describe connections between multiple electronic components.

Figure 3:
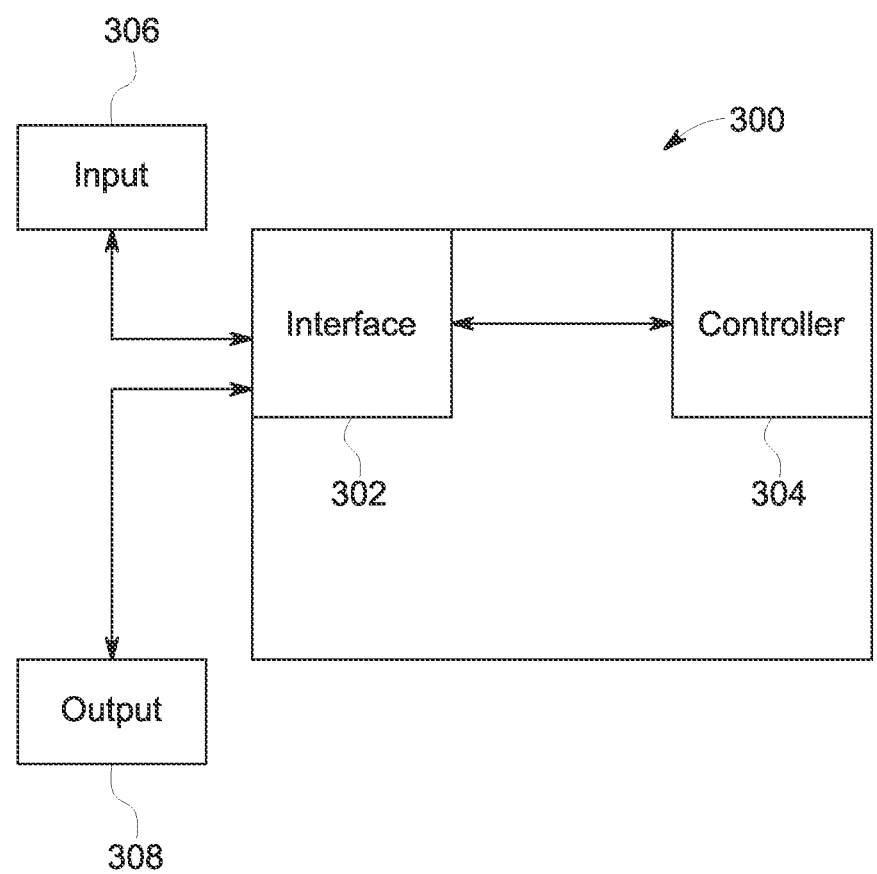
FIG. 3 comprises a block diagram illustrating an apparatus configured to modify a Gerber-compliant data structure according to various embodiments of the present invention.

Referring now to FIG. 3, approaches for an apparatus 300 configured to modify a Gerber-compliant data structure that is representative of an existing PCB layout are herein described. The apparatus 300 includes an interface 302 connected to an input 306 and output 308, and a controller 304.

The controller 304 is coupled to the interface 302 and is configured to obtain the Gerber-compliant data structure at the input 306 of the interface 302. As previously mentioned with regard to some approaches, the Gerber-compliant data structure includes layout information describing a physical layout of the PCB. The modification information represents a modification to the physical layout of the PCB and includes modified or additional electrical connectivity information. The controller 304 is further configured to automatically modify the Gerber-compliant data structure to seamlessly incorporate the modification information which may then be incorporated into the Gerber-compliant data structure to create a new electrical connectivity structure for the Gerber-compliant data structure. In this approach, the controller 304 is configured to present the modified Gerber-compliant data structure at the output 308. This modified Gerber-compliant data structure may then be utilized by a manufacturer to construct a PCB.

In further approaches, the controller 304 is configured to create a second and new Gerber compliant data structure to provide to the output 308. In some approaches, the modification information received at the input 306 is a schematics drawing representation. In other approaches, the modification information is obtained by manual entry into the input. This modification information may include netlist information, schematic information, connectivity information, sizing information, logical information, electronic component information, and component land pattern information. It will be understood that other examples are possible.

Figure 4:
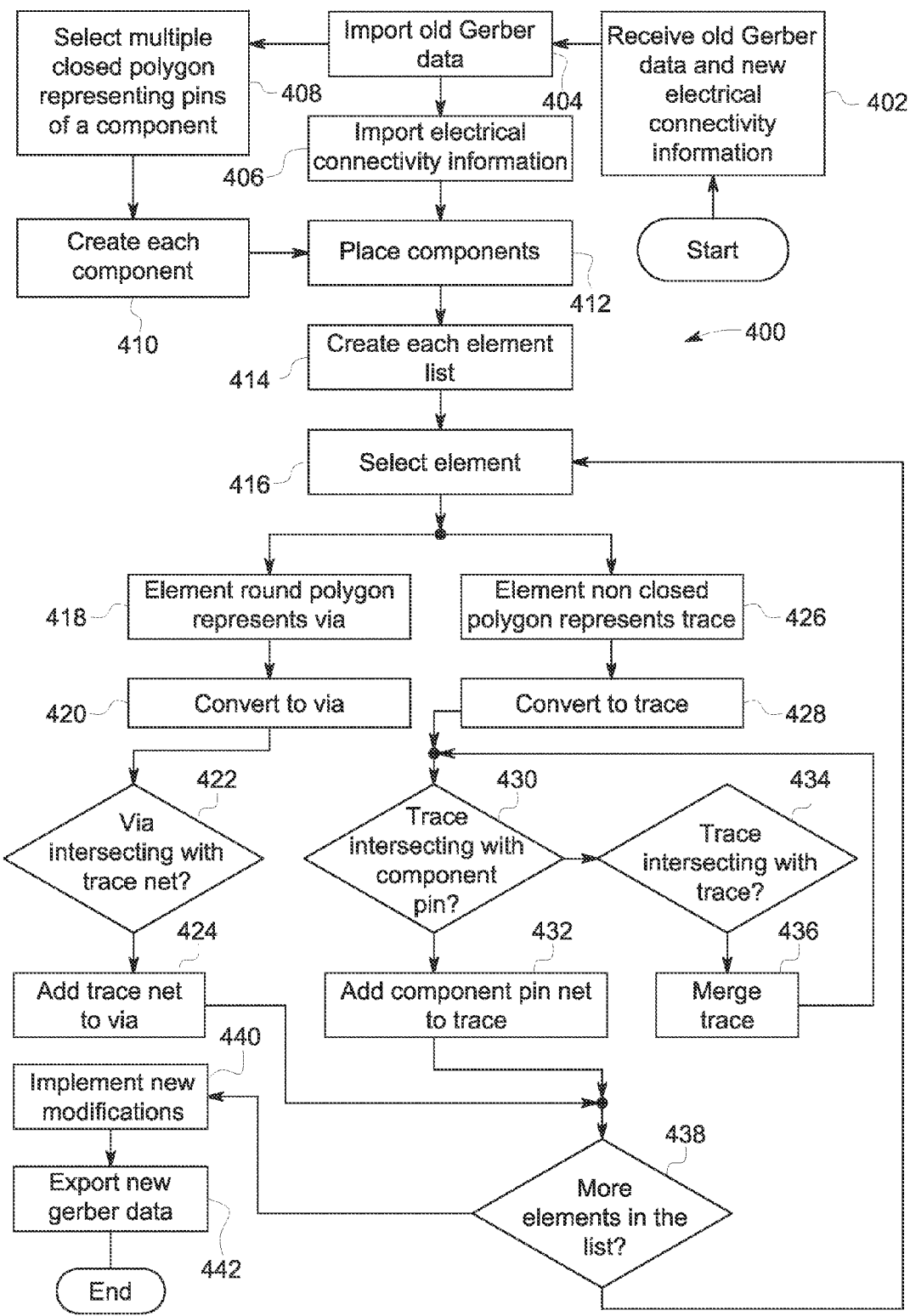
FIG. 4 comprises a flow diagram illustrating a process for file translation according to various embodiments of the present invention.

Referring now to FIG. 4, a flow diagram is provided which illustrates an example file translation process 400. First, at step 402, old Gerber data and new electrical connectivity information is received. Next, at step 404, the old Gerber data is imported into the process. At step 406, electrical connectivity information is imported.

In an optional branch after step 404, at step 408, multiple closed polygons representing component pins are selected. Next, at step 410, each component is created.

At step 412, the components are placed into their respective locations. Next, at 414, each element list is created. At step 416, a particular element is selected. The process 400 may then follow one of two branches.

In a first branch and, at step 418, if the element selected at 416 is a round polygon, a via is represented. At 420, the element is converted to a via. At step 422, the process 400 determines whether the via intersects with a trace net. If so, at step 424, the trace net is added to the via. If not, the process 400 proceeds to step 438.

In a second branch, at step 426, if the element selected at 416 is a non-closed polygon, a trace connection is represented. At step 428, the element is converted to a trace. At step 430, the process 400 determines whether the trace is intersecting with a component pin, if so, at step 432, the component pin net is added to the trace. If not, the process 400 determines whether a trace is intersecting with another trace at step 434. If so, at step 436, the traces are merged. This step 430 may continue until the all traces intersect with the component pin and the component pin net is added to the trace. The process 400 then proceeds to step 438.

At step 438, the process 400 determines if there are more elements in the list. If so, the process returns to step 416. If there are no more elements in the list, at step 440, the new modifications are implemented. Finally, at step 442, the new Gerber data is exported.

Figure 5:
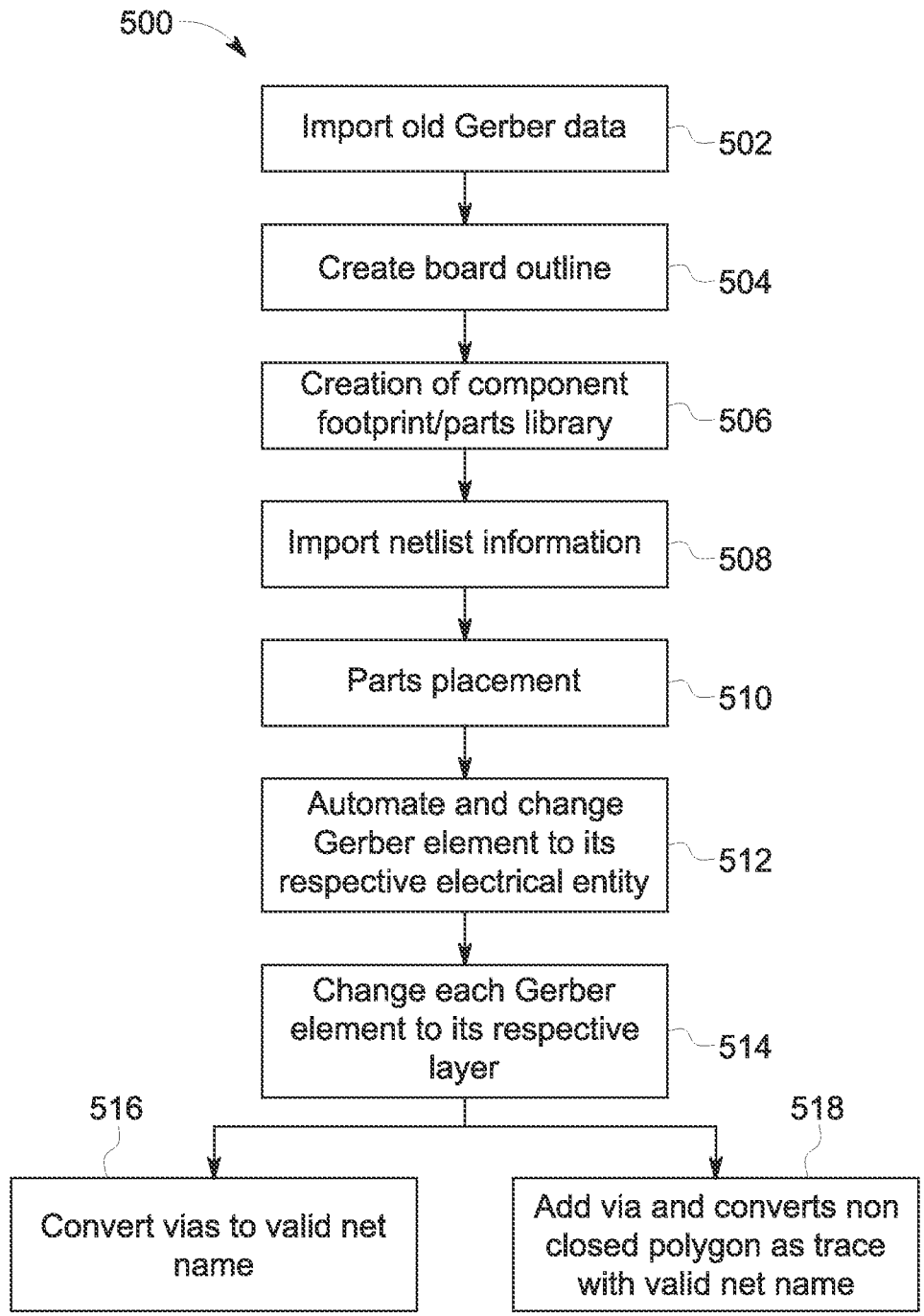
FIG. 5 comprises a flow diagram illustrating a process for file translation according to various embodiments of the present invention.

Referring now to FIG. 5 an alternative flow diagram illustrating a process for file translation 500 is provided. First, at step 502, old Gerber data is imported. Next, at step 504, a board outline is created which describes the location of elements contained thereon. Based on the old Gerber data, a component footprint or parts library is created at step 506 which includes all of the old elements.

At step 508, new netlist information is imported into the process. Next, at step 510, the new components or parts are placed on the board. At step 512, each Gerber element is automatically changed to its respective electrical entity. At step 514, each Gerber element is changed to its respective layer. Finally, the process either converts vias to a valid net name at step 516, or adds a via to the Gerber element and its respective layer and converts non-closed polygons to trace elements having a valid net name at step 518.

Figure 6:
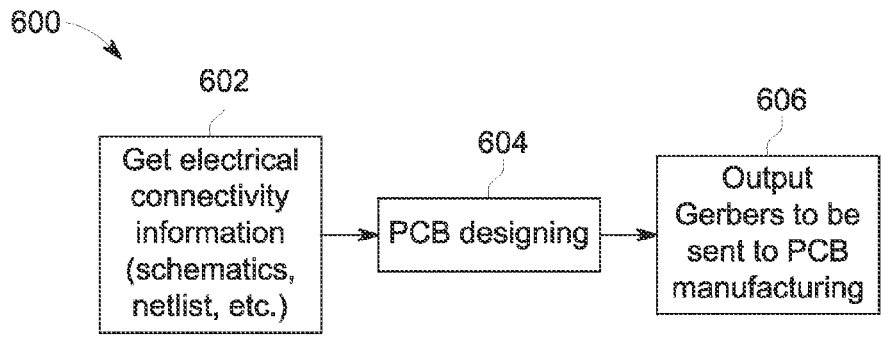
FIG. 6 comprises a flow diagram illustrating a process for file translation according to various embodiments of the present invention.
Figure 7:
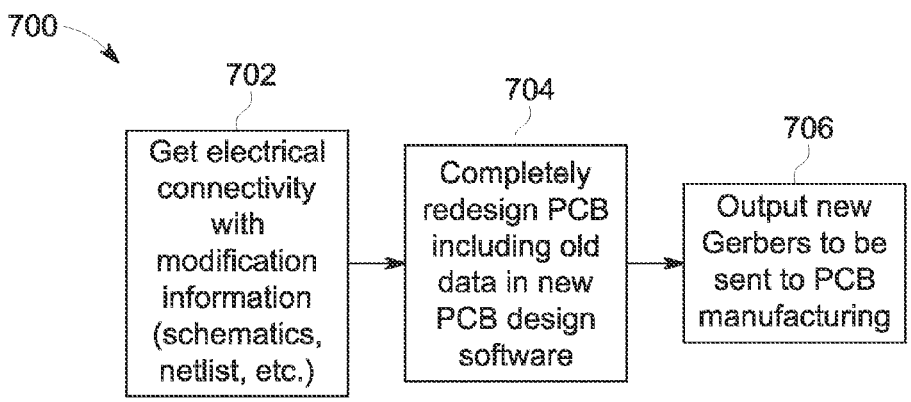
FIG. 7 comprises a flow diagram illustrating an alternative process for file translation according to various embodiments of the present invention.
Figure 8:
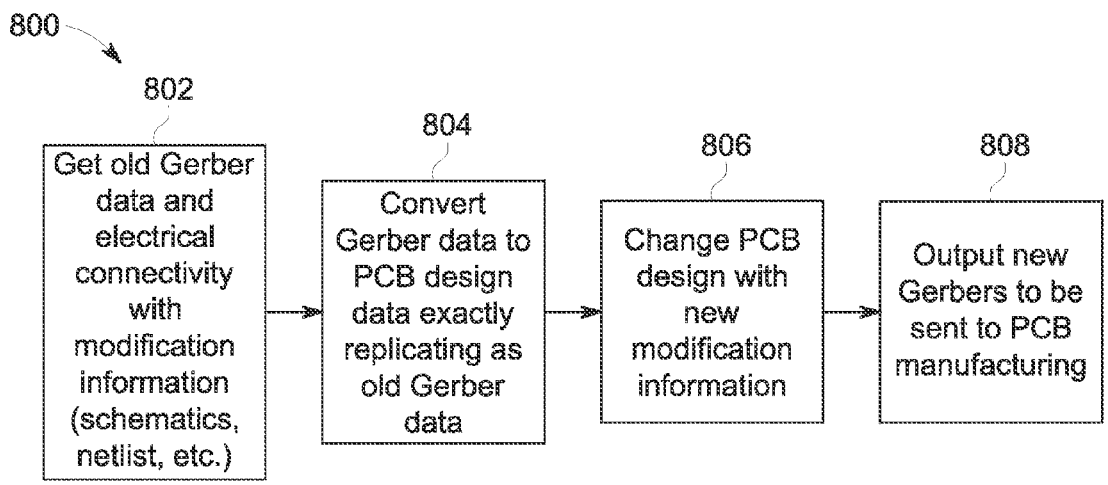
FIG. 8 comprises a flow diagram illustrating an alternative process for file translation according to various embodiments of the present invention.

Referring now to FIGS. 6-8, processes 600, 700, 800 for designing a new PCB are provided. The general steps in the PCB design process are provided in process 600. First, at step 602, electrical connectivity information is obtained which may include any of the previously-mentioned information. Next, the PCB is designed at step 604 using any number of processes as described herein. Finally, at step 606, the output Gerber file is sent to the PCB manufacturer.

In a modified PCB design process 700 where the earlier used PCB design software is either obsolete or unavailable, at step 702, the electrical connectivity information and modification information is obtained. At step 704, the existing PCB is completely redesigned, and the old data is incorporated into the new PCB using new PCB design software. Finally, at step 706, new Gerber files are output to be sent to the PCB manufacturer.

In yet another modified PCB design process 800 where the earlier used PCB design software is either obsolete or unavailable, at step 802, the existing Gerber data from the previous PCB design and electrical connectivity information and modification information is obtained. Next, at step 804, the existing Gerber data is converted to PCB design data such that it is exactly replicated as old Gerber data. At step 806, the PCB design is changed with the new modification information. Finally, at step 808, the new Gerber file is output and sent to the PCB manufacturer.

Figure 9:
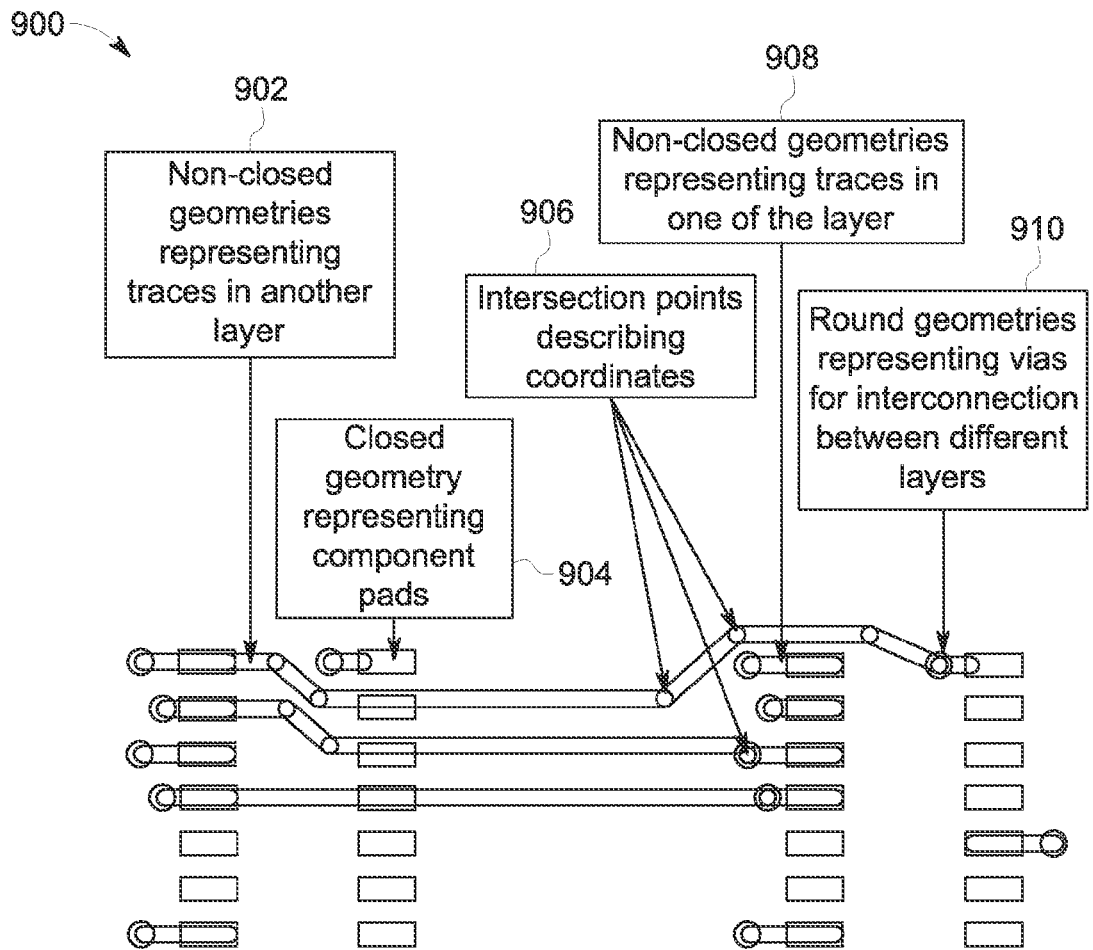
FIG. 9 comprises a file illustrating exemplary existing Gerber file specifications.
Figure 10:
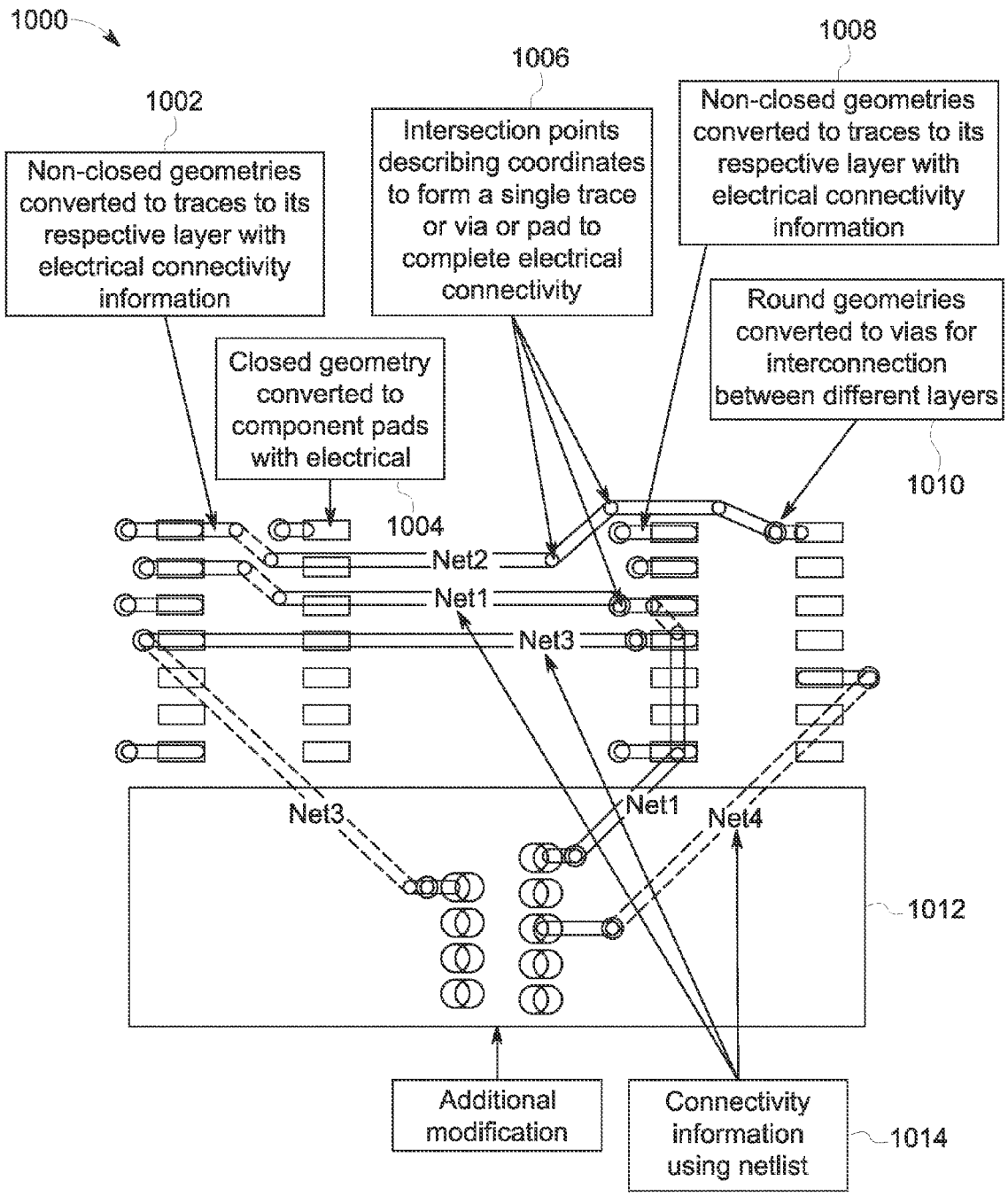
FIG. 10 comprises a file illustrating exemplary converted PCB design file specifications.
Figure 11:
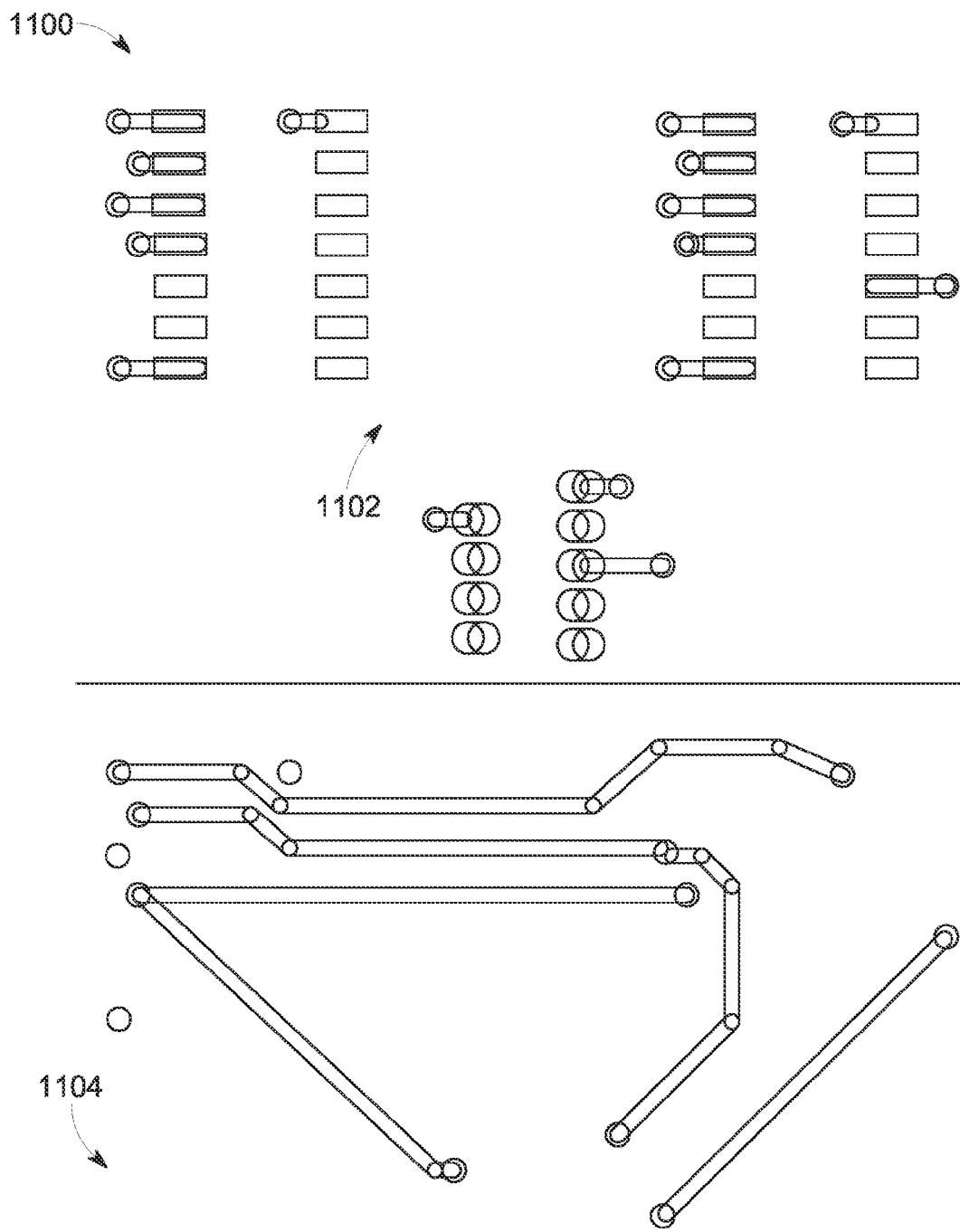
FIG. 11 comprises a file illustrating exemplary modified Gerber file specifications.

Referring now to FIGS. 9-11, files 900, 1000, and 1100 exemplary Gerber and PCB design files are provided. The file 900 may include non-closed geometries 902, 908 representing traces in layers, closed geometry representing component pads 904, intersection points 906 describing coordinates of the geometries, and round geometries 910 which represent vias for interconnection between different layers.

The file 1000 is similar to the file illustrated in FIG. 9, and further includes additional elements. In these regards, the file 1000 includes non-closed geometries 1002, 1008 that are converted to traces to their respective layers with electrical connectivity information 1014, closed geometry 1004 that is converted to component pads with electrical information, intersection points 1006 describing coordinates used to form single traces, vias, or pads to complete electrical connectivity between elements, and round geometries 1010 which are converted to vias for interconnectivity between different layers of the PCB. The file 11000 further includes additional modification information 1012 which may include connectivity information 1014. As described above, the connectivity information 1014 may include netlist information, schematic information, sizing information, logical information, electronic component information, and component land pattern information.

FIG. 11 shows an output file 1100 illustrating an example output of a modified PCB design in Gerber format. Thus, 1102 and 1104 illustrate Gerber files converted to vector formats for different layers.

Figure 12:
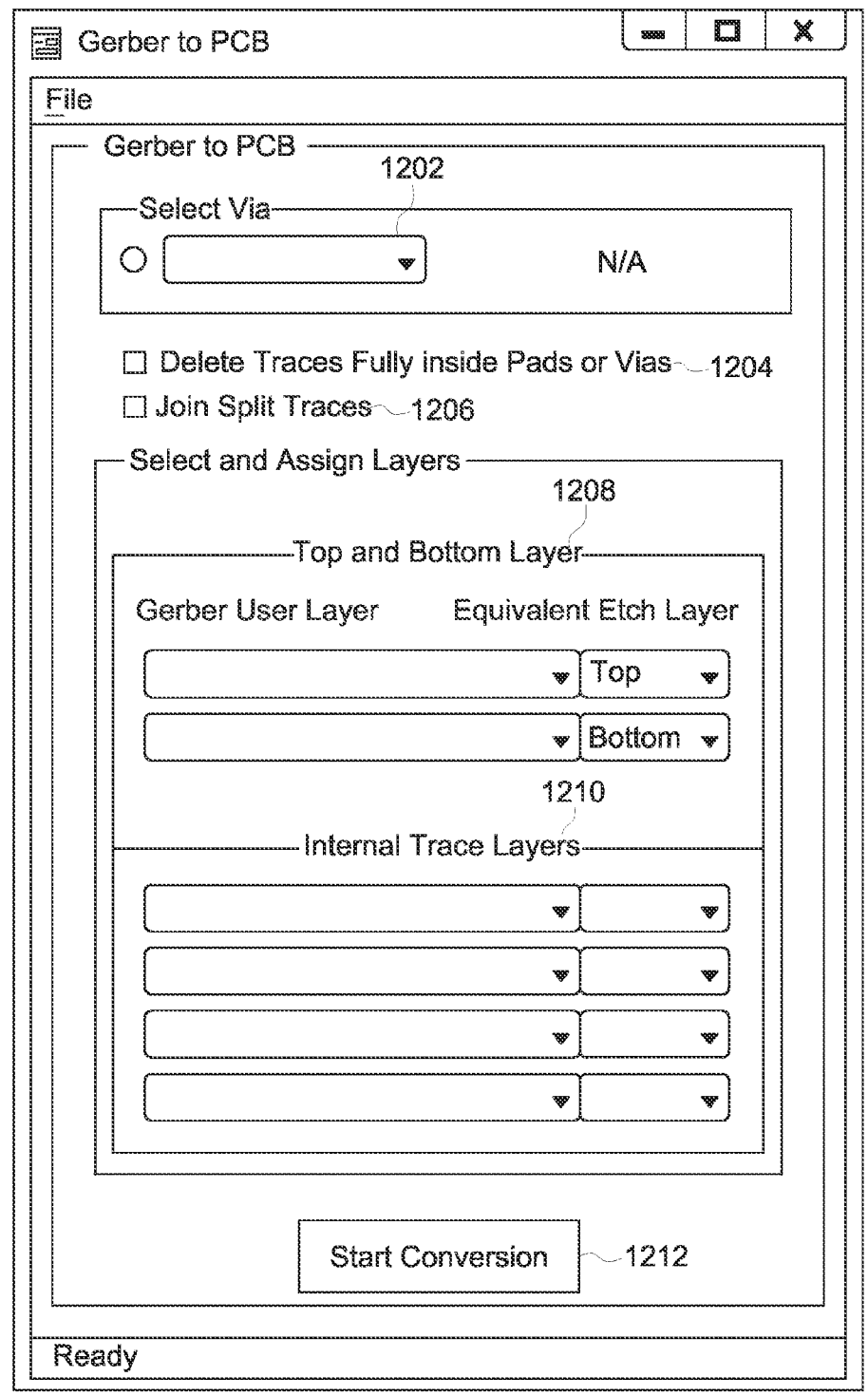
FIG. 12 comprises a user interface for converting a Gerber file to a modified PCB file.

FIG. 12 illustrates an example user interface 1200 for converting a Gerber file to a modified PCB file. The user interface 11200 may be displayed or presented to a user. The user utilizes this interface to select appropriate files and elements to be converted. The user interface 1200 may include a selection box 1202 to select the appropriate via, options to delete or join traces 1204, 1206, modifiers to the top and bottom layers 1208, and modifiers to internal trace layers 1210. The interface 1200 may also include a button to begin the conversion process 1212.

It will be appreciated by those skilled in the art that modifications to the foregoing embodiments may be made in various aspects. Other variations clearly would also work, and are within the scope and spirit of the invention. The present invention is set forth with particularity in the appended claims. It is deemed that the spirit and scope of that invention encompasses such modifications and alterations to the embodiments herein as would be apparent to one of ordinary skill in the art and familiar with the teachings of the present application.

What is claimed is:

1. A method of modifying a Gerber-compliant data structure that is representative of an existing printed circuit board (PCB) layout, the method comprising:
    obtaining a Gerber-compliant data structure, the Gerber-compliant data structure including layout information describing a physical layout of a PCB;
    obtaining modification information representing a modification to the physical layout of the PCB, wherein the modification information includes modified or additional electrical connectivity information;
    automatically modifying the Gerber-compliant data structure to create a modified Gerber-compliant data structure that seamlessly incorporates the modification information, wherein the modified or additional electrical connectivity information is incorporated into the Gerber-compliant data structure to create a new electrical connectivity structure for the Gerber-compliant data structure and constructing a PCB utilizing and according to the modified Gerber-compliant data structure.

2. The method of claim 1, wherein the Gerber-compliant data structure comprises a computer file.

3. The method of claim 1, wherein automatically modifying the Gerber-compliant data structure comprises creating a second and new Gerber-compliant data structure.

4. The method of claim 1 wherein obtaining the modification information comprises receiving a schematics drawing representation.

5. The method of claim 1, wherein obtaining the modification information comprises manually entering the modification information.

6. The method of claim 1, wherein the modification information comprises one or more of netlist information, schematic information, connectivity information, sizing information, logical information, electronic component information, and component land pattern information.

7. The method of claim 1, wherein the modified or additional electrical connectivity information describes connections between multiple electronic components.

8. An apparatus that is configured to modify a Gerber-compliant data structure that is representative of an existing printed circuit board (PCB) layout, the apparatus comprising:
    an interface having an input and output;
    a controller, the controller coupled to the interface, the controller configured to obtain a Gerber-compliant data structure at the input of the interface, the Gerber-compliant data structure including layout information describing a physical layout of a PCB, the controller being further configured to obtain modification information at the input, the modification information representing a modification to the physical layout of the PCB, wherein the modification information includes modified or additional electrical connectivity information, the controller being further configured to automatically modify the Gerber-compliant data structure to create a modified Gerber-compliant data structure that seamlessly incorporates the modification information, wherein the modified or additional electrical connectivity information is incorporated into the Gerber-compliant data structure to create a new electrical connectivity structure for the Gerber-compliant data structure, the controller configured to present the modified Gerber-compliant data structure at the output and wherein the modified Gerber-compliant data structure at the output is utilized by a manufacturer to construct a PCB.

9. The apparatus of claim 8, wherein the Gerber-compliant data structure comprises a computer file.

10. The apparatus of claim 8, wherein the controller is configured to create a second and new Gerber-compliant data structure.

11. The apparatus of claim 8 wherein the modification information is obtained by receiving a schematics drawing representation.

12. The apparatus of claim 8, wherein the modification information is obtained by manually entering the modification information.

13. The apparatus of claim 8, wherein the modification information comprises one or more of netlist information, schematic information, connectivity information, sizing information, logical information, electronic component information, and component land pattern information.

14. The apparatus of claim 8, wherein the modified or additional electrical connectivity information describes connections between multiple electronic components.

15. A computer usable medium having a computer readable program code embodied therein, said computer readable program code adapted to be executed to implement a method of modifying a Gerber-compliant data structure that is representative of an existing printed circuit board (PCB) layout, the method comprising:
    obtaining a Gerber-compliant data structure, the Gerber-compliant data structure including layout information describing a physical layout of a PCB;
    obtaining modification information representing a modification to the physical layout of the PCB, wherein the modification information includes modified or additional electrical connectivity information;
automatically modifying the Gerber-compliant data structure to seamlessly incorporate the modification information, wherein the modified or additional electrical connectivity information is incorporated into the Gerber-compliant data structure to create a new electrical connectivity structure for the Gerber-compliant data structure and constructing a PCB utilizing and according to the modified Gerber-compliant data structure.

* * * * *

UNITED STATES PATENT AND TRADEMARK OFFICE
CERTIFICATE OF CORRECTION

PATENT NO.        : 9,323,880 B2
APPLICATION NO.   : 14/289018
DATED             : April 26, 2016
INVENTOR(S)       : Madananth It is certified that error appears in the above-identified patent and that said Letters Patent is hereby corrected as shown below:

Specification

In Column 5, Line 30, delete "anew" and insert -- a new --, therefor.

In Column 7, Line 7, delete "11000" and insert -- 1000 --, therefor.

In Column 7, Line 21, delete "11200" and insert -- 1200 --, therefor.

Signed and Sealed this
Twenty-third Day of August, 2016

Michelle K. Lee
*Director of the United States Patent and Trademark Office*